United States Patent

Sood

(10) Patent No.: US 9,936,082 B2
(45) Date of Patent: Apr. 3, 2018

(54) METHOD, SYSTEM AND APPARATUS FOR PROCESSING LOW-BALANCE DATA SESSION REQUESTS

(71) Applicant: REDKNEE INC., Mississauga (CA)

(72) Inventor: Chrisaman Sood, Gurgaon (IN)

(73) Assignee: REDKNEE INC., Mississauga (CA)

( * ) Notice: Subject to any disclaimer, the term of this patent is extended or adjusted under 35 U.S.C. 154(b) by 0 days.

(21) Appl. No.: 15/507,175

(22) PCT Filed: Sep. 8, 2014

(86) PCT No.: PCT/CA2014/000681
§ 371 (c)(1),
(2) Date: Feb. 27, 2017

(87) PCT Pub. No.: WO2016/037256
PCT Pub. Date: Mar. 17, 2016

(65) Prior Publication Data
US 2017/0251111 A1    Aug. 31, 2017

(51) Int. Cl.
H04M 11/00    (2006.01)
H04M 15/00    (2006.01)
H04W 4/24    (2018.01)

(52) U.S. Cl.
CPC ......... *H04M 15/852* (2013.01); *H04M 15/64* (2013.01); *H04M 15/83* (2013.01);
(Continued)

(58) Field of Classification Search
CPC .... H04M 15/852; H04M 15/64; H04M 15/83; H04M 15/854; H04M 15/856;
(Continued)

(56) References Cited

U.S. PATENT DOCUMENTS 8,606,222 B2    12/2013    Agarwal et al.
2008/0160954 A1*    7/2008    Agarwal ................ H04L 12/14
                                                               455/405
(Continued)

FOREIGN PATENT DOCUMENTS

WO    2013/107511 A1    7/2013

OTHER PUBLICATIONS

International Search Report dated May 14, 2015 issued from the Canadian Intellectual Property Office relating to PCT International Application No. PCT/CA2014/000681.
(Continued)

*Primary Examiner* — Timothy Pham
(74) *Attorney, Agent, or Firm* — Perry + Currier

(57) ABSTRACT

A method, system and server for processing low balance data session requests are provided. The server includes a memory storing an account record including an account balance and a count of failed service requests; a network interface; and a processor interconnected with the memory and the network interface. The processor receives a request to access a data service for a mobile device corresponding to the account record; and to determine whether the account balance is sufficient to access the data service. When the account balance is not sufficient, the processor compares the count of failed service requests to a threshold. When the count exceeds the threshold, the processor sends a notification to the mobile device, and when the count does not exceed the threshold, the processor increments the count. The processor also returns a message denying access to the data service.

18 Claims, 5 Drawing Sheets

(52) U.S. Cl.
CPC ....... *H04M 15/854* (2013.01); *H04M 15/856* (2013.01); *H04W 4/24* (2013.01)

(58) Field of Classification Search
CPC .... H04M 15/84; H04M 15/85; H04M 15/853; H04W 4/24; H04L 12/1403; H04L 12/1467
USPC ........................................................ 455/406
See application file for complete search history.

(56) References Cited

U.S. PATENT DOCUMENTS

2013/0218657 A1\* 8/2013 Salmon .................. G06Q 10/00
                                                      705/14.29
2013/0346302 A1\* 12/2013 Purves ................. G06Q 20/102
                                                      705/40

OTHER PUBLICATIONS

Written Opinion dated May 14, 2015 issued from Canadian Intellectual Property Office relating to PCT International Application No. PCT/CA2014/000681.

\* cited by examiner

316

| | |
|---|---|
| Device ID | 104 |
| Balance | $0.02 |
| Reserved | $0.00 |
| Last Successful Access | Jul-12-2014 |
| Failed Requests | 85 |
| Notification Counter | 1 |
| Account Status | Active |

METHOD, SYSTEM AND APPARATUS FOR PROCESSING LOW-BALANCE DATA SESSION REQUESTS

FIELD

The specification relates generally to telecommunications networks, and specifically to a method, system and apparatus for processing data session requests for mobile devices with low prepaid balances.

BACKGROUND

Mobile devices, such as smart phones, with data communication (i.e. packetized communications) capabilities can automatically establish data sessions with telecommunications networks. An individual device may establish a large number of sessions over a given time period, depending on the nature of the device and the software executing thereon.

Such devices may attempt to establish data sessions even when their prepaid account balances are too low to successfully establish the sessions. This can lead to rejection of the session requests, followed quickly by further attempts to establish sessions. These frequent requests to establish sessions and rejections thereof can impose a significant burden on the resources of the network, as well as those of the devices (particularly with respect to battery life).

SUMMARY

According to an aspect of the specification, a charging server is provided, comprising: a memory storing an account record including an account balance and a count of failed service requests; a network interface; and a processor interconnected with the memory and the network interface, the processor configured to: receive a request to access a data service for a mobile device corresponding to the account record; determine whether the account balance is sufficient to access the data service; when the account balance is not sufficient to access the data service: compare the count of failed service requests to a threshold; when the count exceeds the threshold, send a notification to the mobile device, and when the count does not exceed the threshold, increment the count; and return a message denying access to the data service.

According to another aspect of the specification, a method is provided in a charging server having a memory, a network interface and a processor interconnected with the memory and the network interface, the method comprising: storing an account record in the memory, including an account balance and a count of failed service requests; receiving, at the processor via the network interface, a request to access a data service for a mobile device corresponding to the account record; determining, at the processor, whether the account balance is sufficient to access the data service; when the account balance is not sufficient to access the data service: comparing, at the processor, the count of failed service requests to a threshold; when the count exceeds the threshold, sending a notification via the network interface to the mobile device, and when the count does not exceed the threshold, incrementing the count; and returning a message via the network interface denying access to the data service.

According to a further aspect of the specification, a non-transitory computer-readable medium is provided storing a plurality of computer-readable instructions executable by a processor of a charging server to perform the above method.

BRIEF DESCRIPTIONS OF THE DRAWINGS

Embodiments are described with reference to the following figures, in which:

FIG. 4 depicts a database maintained by the charging server of FIG. 1, according to a non-limiting embodiment.

DETAILED DESCRIPTION OF THE EMBODIMENTS

Figure 1:
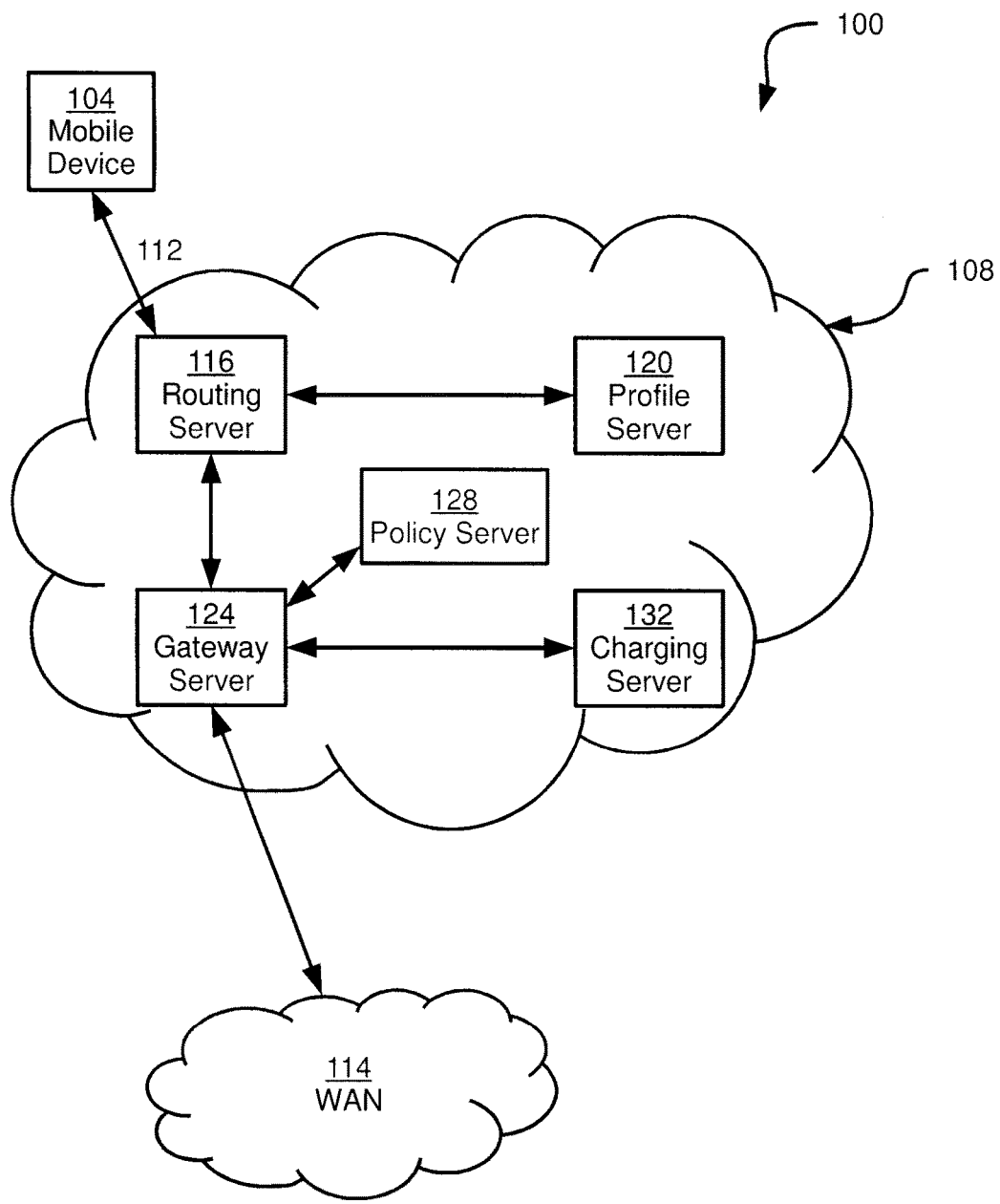
FIG. 1 depicts a communications system, according to a non-limiting embodiment.

FIG. 1 depicts a communications system 100. System 100 includes a mobile device 104, which can be any of a variety of mobile computing devices, including smart phones, cell phones, laptop computers and the like. Mobile device 104 thus has hardware elements including a processing unit, volatile and non-volatile memory, network interfaces, input devices and output devices (e.g. any suitable combination of displays, speakers, microphones, touch screens and the like). The processing unit of mobile device 104 executes programming instructions stored in memory (e.g. the above-mentioned non-volatile storage) for carrying out various functions, including the initiation of data communications over various networks. Multiple mobile devices may be included in system 100, but only mobile device 104 is shown for illustrative purposes.

Mobile device 104 is connected to a core mobile network 108 via a link 112. Core mobile network 108, also referred to herein as network 108, can be based on any suitable standard or combination of standards. In the present example, network 108 is structured according to the Long Term Evolution (LTE) standard set by the 3rd Generation Partnership Project (3GPP). In other examples, however, network 108 can be structured according to a wide variety of other standards, such as the third Generation (3G) standard. The nature of link 112 is therefore variable, and is selected according to the implementation of network 108.

In general, network 108 permits mobile device 104 to communicate with computing devices in other networks, including a wide area network (WAN) 114 such as the Internet, an IP Multimedia Subsystem (IMS) network and the like. Mobile device 104 can be configured to send a request to establish a data session to network 108. If the data session is successfully established, mobile device 104 may be enabled, via network 108, to communicate with other computing devices in WAN 114 for a wide variety of purposes (e.g. retrieving web pages, conducting voice calls and the like). During such a session, the components of network 108 act to carry data between mobile device 104 and WAN 114, to control properties of the data session such as quality of service, and to collect payment from mobile device 104 for the data session. Certain components of network 108 will be described below in conjunction with an attempt by mobile device 104 to establish a data session for communicating with WAN 114. Reference will also be made in the description below to FIG. 2, which depicts an example call flow for attempting to establish a data session between mobile device 104 and network 108.

Network 108 includes various hardware elements that participate in the establishment and maintenance of data sessions with mobile device 104. In particular, network 108 can include a routing server 116, to which mobile device 104 is connected via link 112. In the present example, according to the LTE standard, routing server 116 can be implemented as a conventional Mobility Management Entity (MME). It will now be apparent that link 112 as illustrated can include other hardware elements between mobile device 104 and routing server 116, such as a base station network (e.g. eNodeB in the case of an LTE network). Routing server 116 is configured, upon receiving a request from mobile device 104 to establish a data session with network 108 (FIG. 2, step 200), to authenticate mobile device 104 in network 108 and (if the authentication is successful) to connect mobile device 104 with other elements of network 108.

In the present example, routing server 116 completes the above-mentioned authentication by sending a message to a profile server 120 (FIG. 2, 205) included in network 108. In the present example, profile server 120 can be implemented as a conventional Home Subscriber Server (HSS). In some embodiments, as will be discussed below in greater detail, profile server 120 may have certain characteristics that extend beyond those of a conventional HSS. In general, profile server 120 stores records corresponding to different mobile devices. The records in profile server 120 include various information concerning the corresponding mobile devices, such as device identifiers, geographic locations of devices, identifiers of services to which devices are entitled and so on. Profile server 120, upon receiving the message from routing server 116, is configured to retrieve the record stored therein corresponding to mobile device 104 and to determine whether mobile device 104 is permitted to access network 108 to establish the requested session. This determination will be discussed in greater detail below.

Figure 2:
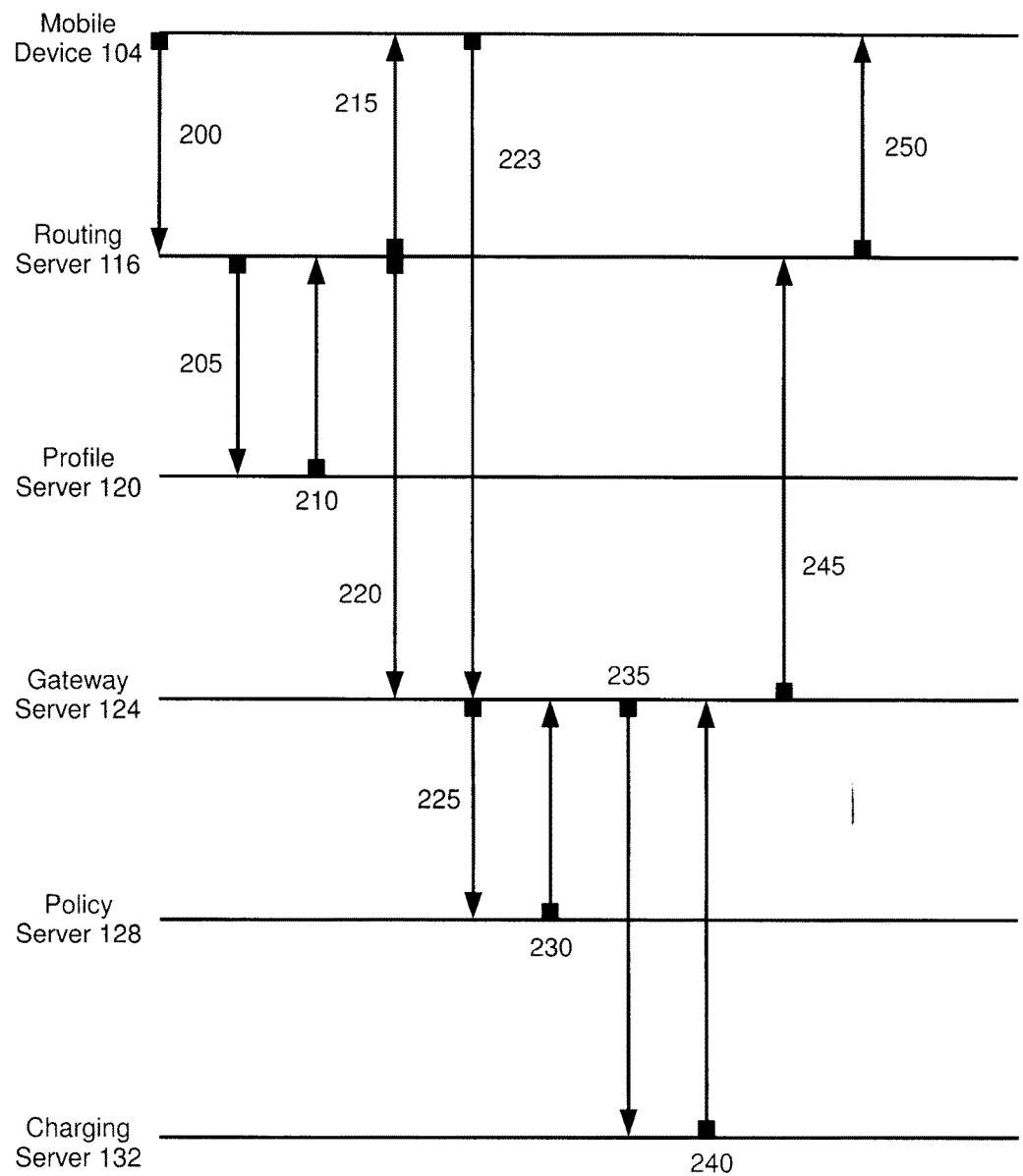
FIG. 2 depicts an attempted establishment of a data session in the system of FIG. 1, according to a non-limiting embodiment.

Assuming that mobile device 104 is determined by profile server 120 to be permitted to access network 108, profile server 120 returns a message indicating such permission to routing server 116 (FIG. 2, 210). Upon receipt of that message, routing server 116 connects mobile device 104 to a gateway server 124 (FIGS. 2, 215 and 220). Gateway server 124 can be implemented, in the present example, as a conventional Packet Data Network Gateway (PDN Gateway or P-GW). It will now be apparent that additional gateway servers may be connected between mobile device 104 and gateway server 124 (e.g. serving gateways or S-GWs), but those gateways are omitted from FIG. 1 for simplicity of illustration.

Gateway server 124, as will now be apparent to those skilled in the art, allows mobile device 104 to access other data networks, such as WAN 114. That is, once a data session is established with mobile device 104, gateway server 124 carries data from mobile device 104 to WAN 114, as well as data from WAN 114 to mobile device 104. Once the data session has been established as described above, in some embodiments mobile device 104 is configured to send a service request to gateway server 124 (FIG. 2, 223). The service request may indicate the specific element in WAN 114 that mobile device 104 is attempting to access, such as a specific URL. In other words, the establishment of a data session at steps 200-220 of FIG. 2 may provide the foundation necessary for mobile device 104 to access WAN 114. It will now be apparent to those skilled in the art that a "data session" as referred to above may also be termed a Packet Data Protocol (PDP) context; one or more data services (e.g. web pages and the like) may be accessed over a given PDP context, whether sequentially or in parallel. In other embodiments, there may be no distinction between the establishment of a session and the access of a service (that is, mobile device 104 may be required to establish a new session, beginning at step 200 of FIG. 2, each time mobile device 104 attempts to access a new service in WAN 114). Before connecting mobile device 104 to WAN 114 (thus establishing the data session originally requested by mobile device 104), however, gateway server 124 is configured to interact with a policy server 128 and a charging server 132. In some embodiments, the interaction between gateway server 124 and policy server 128 can precede the receipt of a service request from mobile device 104.

In the present example, in which network 108 is the LTE core network, policy server 128 can be implemented as a conventional Policy and Charging Rules Function (PCRF), whose capabilities will readily occur to those skilled in the art. In brief, in response to a request from gateway server 124 (FIG. 2, 225) policy server 128 generates and provides rules for the requested data session to gateway server 124 (FIG. 2, 230; for example, over the Gx interface specified by the 3GPP). Gateway server 124 will use the rules from policy server 128 to control the data session established between mobile device 104 and network 108. Such rules may include charging rates for various types of data (e.g. for different data services that may be requested by mobile device 104 over the data session), restrictions on the types or volume of data that mobile device 104 is permitted to access, and the like. Following step 230 in FIG. 2, the data session between mobile device 104 and network 108 can be considered successfully established, although mobile device 104 may not yet be permitted to access WAN 114. As noted earlier, in systems lacking a distinction between data sessions and data service accesses, no session has yet been established.

Charging server 132 can be implemented as a modified Online Charging System (OCS), and thus certain conventional capabilities of charging server 132 will now occur to those skilled in the art. In general, charging server 132 is configured to process payment for the services accessed over the data session from an account associated with mobile device 104, while the service access over the data session is ongoing. In other words, mobile device 104 is associated with a prepaid account at charging server 132, and charging server 132 conducts payment processing from the prepaid account substantially in real time. Charging server 132 stores a prepaid account balance corresponding to mobile device 104, and in response to a request from gateway server 124 (FIG. 2, 235; e.g. over the Gy interface specified by the 3GPP) determines whether the account balance corresponding to mobile device 104 is sufficient to permit mobile device 104 to access the data service requested by mobile device 104 over the data session. The nature of the determination is not particularly limited. For example, charging server 132 can be configured to determine whether sufficient balance exists in the prepaid account to sustain the data service access for a predefined initial time period or initial volume of data.

When the account balance mentioned above is sufficient to support access of the requested data service, charging server 132 is configured to reserve a portion of the account balance for the data service access and inform gateway server 124 of the reserved amount, after which gateway server 124 will permit mobile device 104 to connect to WAN 114. In other words, in embodiments lacking a distinction between a data session and a service access, the data session initially requested by mobile device 104 will be successfully established. In embodiments in which a data session was established at 230, following a successful balance check at 235, the requested data service access is permitted, or established, over the previously established data session. Thereafter, during the data service access gateway server 124 can be configured to report usage data to charging server 132 (e.g. the volume of data exchanged between mobile device 104 and WAN 114), to decrement the reserved amount or quota in response to such usage, and to request additional quota when the initial quota allocated by charging server 132 is exhausted.

On the other hand, when the account balance is not sufficient to support the requested data service access, charging server 132 is configured to inform gateway server 124 that the data service cannot be supported (FIG. 2, 240), upon which gateway server 124 denies access of the service (FIGS. 2, 245 and 250). In embodiments lacking a distinction between a data session and a service access, this effectively aborts establishment of the data session. The manner in which charging server 132 is configured to inform gateway server 124 of the insufficiency of the account balance is not particularly limited. In some examples, in which the communications between charging server 132 and gateway server 124 are based on a variant of the known Diameter protocol (e.g. the Gy variant of Diameter), an error code 4012, or "Diameter Credit Limit Reached", message can be sent from charging server 132 to gateway server 124.

As seen in FIG. 2, the attempted access of a data service by mobile device 104 over network 108, even if unsuccessful for lack of funds in the account corresponding to mobile device 104, generates a significant volume of signalling traffic within network 108. Further, mobile device 104 may be configured to automatically attempt to repeat the service request (or re-establish the data session) at frequent intervals. For example, mobile device 104 may store a weather application configured to retrieve the current weather for the current location of mobile device 104 from a server in WAN 114. When the account corresponding to mobile device 104 at charging server 132 has a low or zero balance and cannot support a data session initiated by the weather application, the weather application may cause mobile device 104 to request a new service access or session shortly after (or even immediately after) the previous session establishment is aborted due to the low balance associated with mobile device 104.

Such repeated attempts to access data services or establish data sessions, or both, may lead to hundreds or thousands of attempted services accesses or session establishments per day being initiated by mobile device 104. For example, in certain networks the inventors have determined that through normal usage, smart phones can make as many as 4000-8000 attempts to access data services per day when the corresponding accounts do not have sufficient balances to support the requested sessions. Each such attempt causes at least a portion of the signalling flow shown in FIG. 2 to take place. Specifically, in a system in which a data session may be established and data services are requested over that data session, the signaling of steps 223-250 may be repeated with each attempt. In other embodiments, in which failure due to a low balance results in not only refusal of the service access but also abortion of the data session itself, steps 200-250 may be repeated with each attempt. Thus, as will now be apparent to those skilled in the art, the low balance associated with mobile device 104 can cause a significant burden on network 108.

Charging server 132 is therefore configured to perform certain actions that extend beyond those specified for the OCS in the 3GPP standards. Such actions will be described in greater detail below. In general, charging server 132 is configured to track the frequency with which mobile device 104 unsuccessfully requests access to data services, and to take various actions in response to such unsuccessful requests in order to reduce the impact of the requests on the performance of network 108. Before describing the above-mentioned actions in detail, certain components of charging server 132 will be described.

Figure 3:
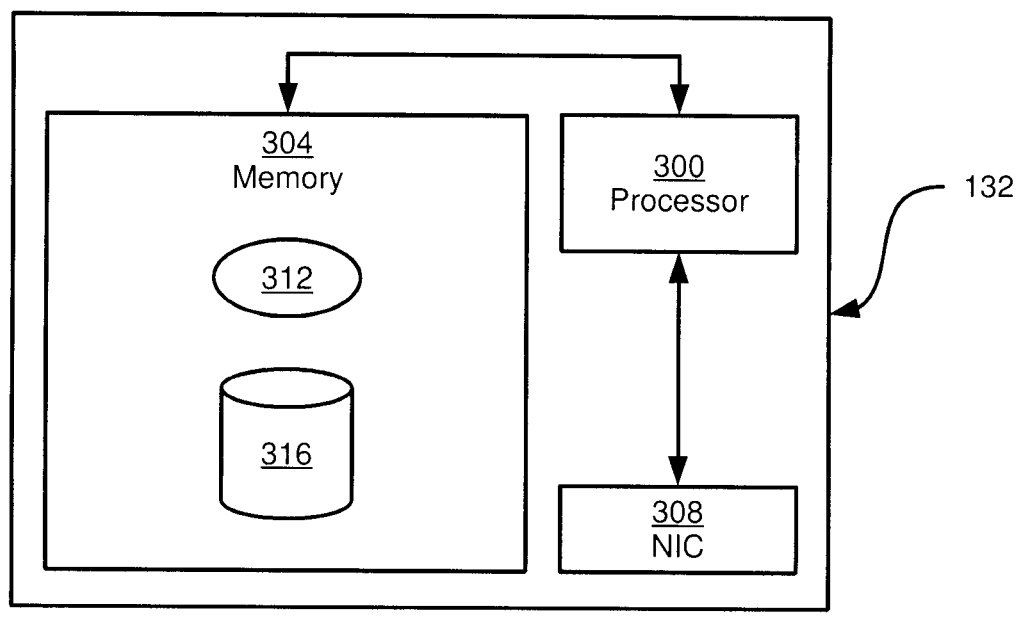
FIG. 3 depicts internal components of the charging server of FIG. 1, according to a non-limiting embodiment.

Turning to FIG. 3, certain internal components of charging server 132 are depicted. Charging server 132 includes a central processing unit (CPU) 300, also referred to herein as a processor 300, interconnected with a memory 304. Processor 300 and memory 304 are generally comprised of one or more integrated circuits (ICs), and can have a variety of structures, as will now occur to those skilled in the art (for example, more than one CPU can be provided).

Memory 304 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. In the present example, memory 304 includes both volatile and non-volatile storage.

Processor 300 is also interconnected with one or more network interfaces, such as a network interface controller (NIC) 308, which allows charging server 132 to connect to other computing devices in network 108. NIC 308 thus includes the necessary hardware to communicate over network 108 with such other devices (and, in some embodiments, over WAN 114). Charging server 132 can also include input devices (not shown) interconnected with processor 300, such as a keyboard and mouse, as well as output devices (not shown) interconnected with processor 300, such as a display. In some embodiments, the input and output devices can be connected to processor 300 via NIC 308 and another computing device. In other words, input and output devices can be local to charging server 132, or remote.

Memory 304 stores a plurality of computer-readable programming instructions, executable by processor 300, in the form of various applications, and also stores various types of data for use during the execution of those applications. As will be understood by those skilled in the art, processor 300 can execute the instructions of or more such applications in order to perform various actions defined within the instructions. In the description below, processor 300 or charging server 132 is said to be "configured to" perform certain functions. It will be understood that charging server 132 is so configured via the execution of the instructions of the applications stored in memory 304 by processor 300.

Among the applications stored in memory 304 is a charging application 312, which is executable by processor 300 to perform various actions described herein, including the actions of charging server 132 described above in connection with FIGS. 1 and 2. Memory 304 also stores an account database 316. An example account database 316 is shown in FIG. 4.

As seen in FIG. 4, account database 316 includes a plurality of records each corresponding to a mobile device. It is contemplated that database 316 can be stored in a variety of formats, and is not limited to the tabular format shown in FIG. 4. In the present example, only one record 400 is shown, corresponding to mobile device 104. Record 400 includes a device identifier, which may be any data suitable for distinguishing mobile device 104 from other mobile devices. For example, the device identifier can be a MSISDN. Record 400 also includes a current account balance, indicating the level of funds available to mobile device 104 to pay for data service accesses. Record 400 also includes an indication of how much of the account balance is reserved for ongoing service accesses (and therefore not available for new services).

In addition, record 400 includes a failed requests counter, indicating the number of unsuccessful attempts to access data services made by mobile device 104 since the last time the counter was reset. The failed requests counter counts only those attempts that failed due to insufficient account balance, as determined by charging server 132 (e.g. by the generation of a 4012 error code at charging server 132).

Record 400 also includes a notification counter, indicating the number of times mobile device 104 has been notified according to mechanisms described in greater detail below; and an account status indicator indicating whether the account corresponding to mobile device 104 is active (e.g. permitted to access data services) or blocked (e.g. not permitted to access data services).

Figure 5:
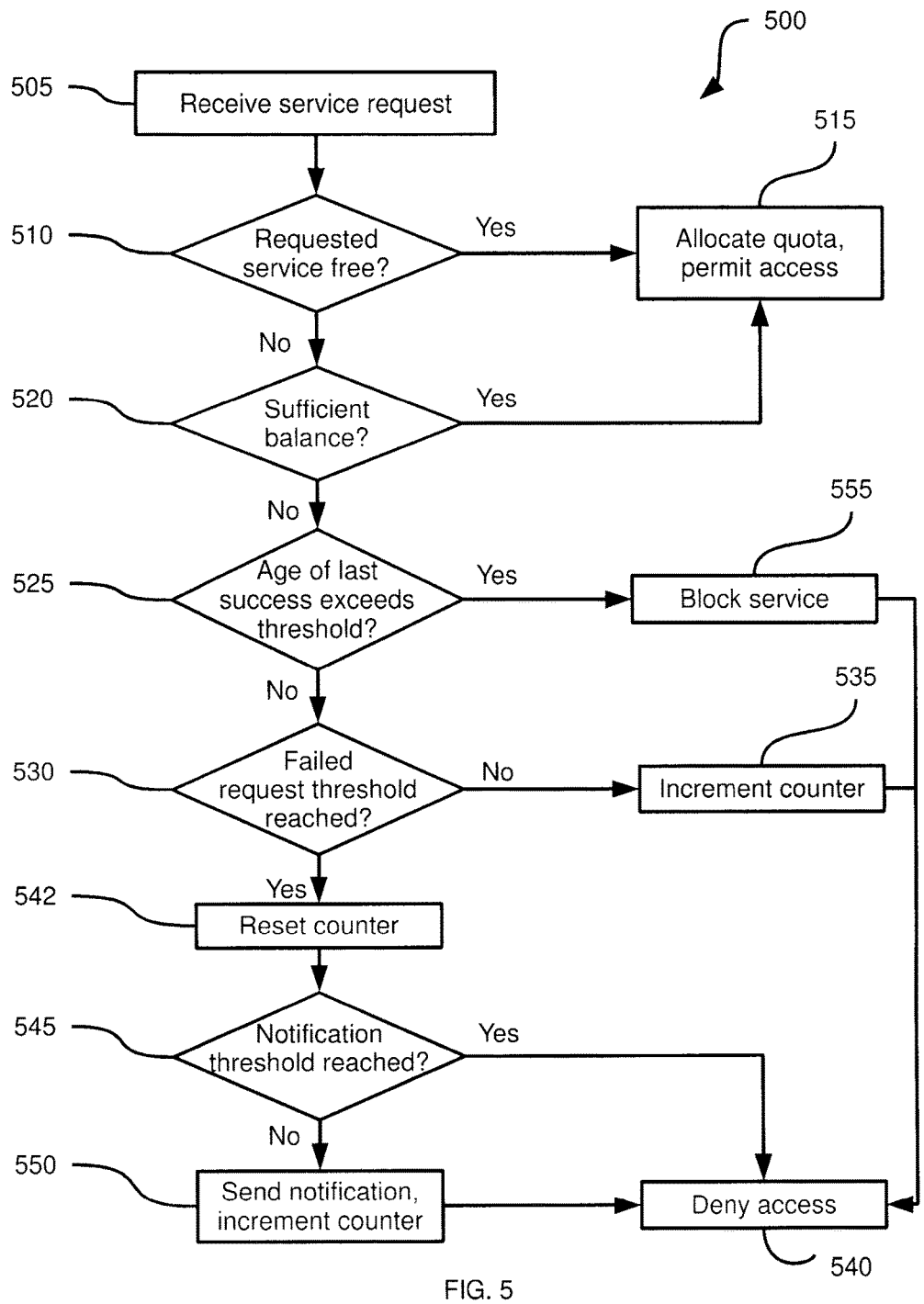
FIG. 5 depicts a method of processing session requests, according to a non-limiting embodiment.

Turning now to FIG. 5, a method 500 of processing data service requests is depicted. The performance of method 500 will be discussed in conjunction with its performance in system 100, but it is contemplated that method 500 can also be implemented in other suitable systems. In the present example, the steps of method 500 are performed by charging server 132, via the execution of application 312 by processor 300.

At block 505, charging server 132 receives a request to access a data service for mobile device 104 via network 108. Referring briefly to FIG. 2, the request received at block 505 can be received from gateway server 124 (FIG. 2, step 235). In other words, the receipt of the request at block 505 indicates that mobile device 104 was authorized by profile server 120 to access network 108 and was connected with gateway server 124 by routing server 116. The request received at block 505 can include, for example, an identifier of mobile device 104 (e.g. a MSISDN), an indication of the requested service (e.g. a URL in WAN 114), and the like.

At block 510, charging server 132 can optionally be configured to determine whether the requested service is free of charge. For example, charging server 132 can maintain in memory 304 a list (not shown) of services for which no account balance is necessary. Certain URLs may be accessible free of charge to mobile device 104, for example, and so if the request at block 505 is a request to access a free URL, no balance check is required to permit access to the service.

If the determination at block 510 is affirmative, the performance of method 500 is completed at block 515, at which charging server 132 allocates quota (irrespective of the account balance associated with mobile device 104 in database 316) and instructs gateway server 124 to permit access to the data service.

If, however the determination at block 510 is negative (that is, the requested data service is not a free service), the performance of method 500 proceeds to block 520, at which charging server 132 determines whether the account balance corresponding to mobile device 104 in database 316 is sufficient to support the requested service. The particular implementation of block 520 is not particularly limited. For example, charging server may be configured to compare the account balance (such as that shown in FIG. 4) corresponding to mobile device 104 with a predefined initial quota amount stored in memory 304. If the account balance does not meet the predefined initial quota, the determination at block 520 is negative. In other examples, charging server 132 can be configured to determine the cost (based on a rate stored in memory 304 for the requested service) of a predefined initial volume of data, and compare the cost to the account balance in database 316. If the account balance in database 316 is lower than the cost, the determination at block 520 is negative.

When the account balance corresponding to mobile device 104 is sufficient to support the requested service, the performance of method 500 proceeds to block 515, at which a quota is allocated (in this case, from the account balance, as the requested service is not free) and access to the data service is permitted.

When the account balance is not sufficient to support the requested service, however, the performance of method 500 proceeds to block 525. At block 525, charging server 132 is configured to determine an age of the last successful service access for mobile device 104, and compare the age with a predefined age threshold stored in memory 304. The age may be determined by comparing the current time and date with the time of the last successful service access as stored in database 316 (see FIG. 4). In the present example performance of method 500, assuming the current date is Jul. 15, 2014, the age of the last successful service access for mobile device 104 is three days. Further assuming that the age threshold is ten days, the determination at block 525 is negative, because the age of the last service successfully accessed by mobile device 104 has not yet exceeded the predefined age threshold. The performance of method 500 therefore proceeds to block 530.

At block 530, charging server 132 is configured to determine whether the number of failed requests indicated in database 316 for mobile device 104 has exceeded a predefined failed request threshold stored in memory 304. For example, the threshold may be three hundred failed requests, in which case the determination is negative, because the count of failed requests in database 316 as shown in FIG. 4 is eight-five. Thus, the performance of method 500 proceeds to block 535.

At block 535, charging server 132 is configured to automatically update the count of failed requests in database 316. Thus, in the present example, the contents of the "Failed Requests" field in record 400 would be updated from "85" to "86". Charging server 132 is then configured to deny access to the service requested at block 505. Denying access can include returning a message containing the Diameter code 4012 to gateway server 124 (see also FIG. 2, step 240).

It will now be apparent that mobile device 104 may make further service requests following denial of access at block 540. Each subsequent service request results in another performance of method 500, and in the present example, assuming the account balance in record 400 is not topped up, each performance of method 500 will result in incrementing the count of failed requests.

When the determination at block 530 is affirmative (for example, in a subsequent performance of method 500 after the failed request count in record 400 has reached three hundred), charging server 132 proceeds to block 542 instead of block 535. At block 542, the counter in record 400 is reset to zero, and charging server 132 then advances to block 545.

At block 545, having reset the count of failed requests in record 400, charging server 132 is configured to determine whether the counter of notifications sent stored in record 400 has reached a predefined threshold. The notifications counter in record 400 indicates the number of notifications sent to mobile device 104, since the last reset of the counter, instructing mobile device 104 to replenish the account balance in record 400.

As seen in FIG. 4, in the present example, the notifications counter is currently at one. Assuming that the notification threshold is greater than one, the determination at block 545 is negative, and charging server 132 proceeds to block 550. At block 550, charging server 132 increments the notifications counter automatically (i.e. record 400 is updated to replace the "1" with "2") and sends a notification to mobile device 104.

The nature of the notification sent at block 550 is not particularly limited. For example, the notification can take the form of a message (e.g. an SMS message) stating that the account balance corresponding to mobile device 104 is too low to support further data service access, and must be replenished. In some embodiments, the message can include a URL, USSD code or the like that can be selected or entered at mobile device 104 to direct mobile device 104 to a replenishment web page hosted by charging server 132. In other embodiments, the notification message can also include an indication of a time period, and an indication of an offer available to mobile device 104 if the account balance in record 400 is replenished within that time period. The nature of the time period and the offer is widely variable. Charging server 132 can store a database of such offers and time periods, and can therefore generate the notification message by selecting an offer and a time period from the database, for example based on the geographic location of mobile device 104, the time of day, and the like. Example offers can include free airtime, discounts on replenishments, or free increases to replenishment amounts (e.g. if mobile device 104 replenishes the account within two hours of receipt of the notification message, the account will be replenished by the amount supplied by mobile device 104 plus an additional percentage of that amount, at no charge to mobile device 104).

After sending the notification (or after an affirmative determination at block 545), charging server 132 denies access to the requested service at block 540. It is contemplated that the notification counter may be reset at predefined intervals, such as every day, every week, and the like.

Returning to block 525 of method 500, if charging server 132 determines that the age of the last successful service request (that is, the last request from mobile device 104 that did not result in denied access due to an insufficient account balance) exceeds the predefined age threshold, performance of method 500 proceeds to block 555. At block 555, charging server 132 can be configured to block service to mobile device 104, and then proceed to block 540 where the service request is denied, bypassing the performance of blocks 530, 535, 542, 545 and 550.

The implementation of the blocking of service at block 555 is not particularly limited. In some examples, a link can be implemented between charging server 132 and profile server 120 (e.g. a link based on Man Machine Language (MML) or any other suitable protocol), and profile server 120 can additionally be configured to store an indication of whether the account associated with mobile device 104 is active or disabled. Profile server 120 can further be configured to inspect the indication upon receiving a message from routing server (see FIG. 2, step 205), and to reject the establishment of a data session for mobile device 104 if the account associated with mobile device 104 is disabled. In this context, rejecting the establishment of a session can occur even before mobile device 104 has requested a service. In other words, mobile device 104 can be prevented from connecting to network 108 at all. In some embodiments, the block may affect only sessions established for data communications, and not sessions established for voice communications. Thus, at block 550, charging server 132 can update the "account status" field of record 400 to indicate that mobile device 104 is blocked from accessing network 108, or from establishing a type of session (e.g. data, as opposed to voice) with network 108. Charging server 132 can also be configured to send the updated account status to profile server 120 over the link mentioned above. For example, mobile device 104 may be permitted to make voice calls, but blocked from requesting any data sessions. Subsequent attempts by mobile device 104 to establish data sessions with network 108 will be aborted at step 205 in FIG. 2, and will thus reduce the signalling burden imposed on gateway server 124, policy server 128 and charging server 132.

Charging server 132, in embodiments where block is implemented as set out above, can be configured to remove the block upon receipt of an account replenishment from mobile device 104, and also to instruct profile server 120 to re-activate the account associated with mobile device 104. Receipt of a replenishment at charging server 132 from mobile device 104 can also cause charging server 132 to reset all counters in record 400 (e.g. clear the "last successful session" field, and set the "failed requests" and "notification counter" fields to zero.

Other implementations of block 555 are also contemplated. For example, an account status may be updated in a database accessible to policy server 128 (such as a Subscriber Profile Repository (SPR)) rather than in profile server 120. A new attempt by mobile device 104 to establish a data session with network 108 would therefore be blocked at steps 225/230 in FIG. 2, rather than steps 205/210.

Various advantages to the above systems and methods will now be apparent to those skilled in the art. For example, sending the above-mentioned notifications to mobile device 104 based on the number of failed session requests made by mobile device 104 may result in mobile device 104 replenishing the account balance at charging server 132, which in turn results in fewer failed session requests and the signalling burden associated therewith. Successfully established data sessions do impose a certain burden on network 108, but successful sessions are generally established less frequently than failed sessions (because successful sessions are not immediately aborted, but rather persist for some time, and fewer signaling events are necessary to maintain a session than to establish a session). In the event that mobile device 104 does not make a replenishment, blocking mobile device 104 from establishing data sessions with network 108 also reduces the signalling burden on network 108 associated with attempts to establish data sessions.

Variations to the above systems and methods are contemplated. For example, in some embodiments blocks 525 and 545 can be omitted. In other words, charging server 132 can be configured simply to send a notification every time a predefined number (e.g. 300) of failed session requests is reached. In other embodiments, frequency thresholds can be used instead of simple counters. For example, rather than a total number of failed requests, the threshold applied at block 530 can be a frequency of failed request, defined as a predefined number of requests over a predefined time period (e.g. 300 requests over one hour). As a result, the "failed requests" field in record 400 can be updated not only to increment for each failed request, but also to count only those failed requests occurring in the relevant time period. For instance, the field may contain a list of previous failed requests and the times at which those requests were made.

Charging server 132 can then be configured to discard any failed request records that are older than the predefined time period.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

I claim:

1. A charging server, comprising:
a memory storing an account record including an account balance and a count of failed service requests;
a network interface; and
a processor interconnected with the memory and the network interface, the processor configured to:
receive a request to access a data service for a mobile device corresponding to the account record;
determine whether the account balance is sufficient to access the data service;
when the account balance is not sufficient to access the data service:
compare the count of failed service requests to a threshold;
when the count exceeds the threshold, send a notification to the mobile device, and when the count does not exceed the threshold, increment the count; and
return a message denying access to the data service.

2. The charging server of claim 1, wherein the account record further contains a time of the last successful data service access by the mobile device; the processor further configured to:
determine an elapsed time between the receipt of the request and the time of the last successful data service access;
when the elapsed time is greater than a threshold, block service to the mobile device and return the message denying access to the data service.

3. The charging server of claim 2, the processor further configured to:
block service to the mobile device by sending a message to a profile server via the network interface, for deactivating an account associated with the mobile device at the profile server.

4. The charging server of claim 1, wherein the notification comprises a message indicating a replenishment time period.

5. The charging server of claim 4, the processor further configured to:
receive a replenishment request from the mobile device;
determine whether the replenishment request was received within the time period; and
when the replenishment request was received within the time period, apply a replenishment amount and an additional replenishment amount to the account balance.

6. The charging server of claim 5, the processor further configured to:
responsive to applying the replenishment amount, reset the count of failed session requests.

7. A method in a charging server having a memory, a network interface and a processor interconnected with the memory and the network interface; the method comprising:
storing an account record in the memory ; including an account balance and a count of failed service requests;
receiving, at the processor via the network interface ; a request to access a data service for a mobile device corresponding to the account record;
determining, at the processor, whether the account balance is sufficient to access the data service;
when the account balance is not sufficient to access the data service:
comparing, at the processor; the count of failed service requests to a threshold;
when the count exceeds the threshold; sending a notification via the network interface to the mobile device, and when the count does not exceed the threshold ; incrementing the count; and
returning a message via the network interface denying access to the data service.

8. The method of claim 7, wherein the account record further contains a time of the last successful data service access by the mobile device; the method further comprising:
determining, at the processor, an elapsed time between the receipt of the request and the time of the last successful data service access;
when the elapsed time is greater than a threshold, blocking service to the mobile device and returning the message denying access to the data service.

9. The method of claim 8, further comprising:
blocking service to the mobile device by sending a message to a profile server via the network interface, for deactivating an account associated with the mobile device at the profile server.

10. The method of claim 7, wherein the notification comprises a message indicating a replenishment time period.

11. The method of claim 10, further comprising:
receiving, at the processor via the network interface, a replenishment request from the mobile device;
determining, at the processor, whether the replenishment request was received within the time period; and
when the replenishment request was received within the time period, applying a replenishment amount and an additional replenishment amount to the account balance.

12. The method of claim 11, further comprising:
responsive to applying the replenishment amount, resetting the count of failed session requests.

13. A non-transitory computer-readable medium storing a plurality of computer-readable instructions executable by a processor of a charging server to perform a method comprising:
storing an account record in a memory of the charging server, including an account balance and a count of failed service requests;
receiving, at the processor via a network interface of the charging server, a request to access a data service for a mobile device corresponding to the account record;
determining, at the processor, whether the account balance is sufficient to access the data service;
when the account balance is not sufficient to access the data service:
comparing, at the processor, the count of failed service requests to a threshold;
when the count exceeds the threshold, sending a notification via the network interface to the mobile device, and when the count does not exceed the threshold, incrementing the count; and
returning a message via the network interface denying access to the data service.

14. The non-transitory computer-readable medium of claim 13, wherein the account record further contains a time of the last successful data service access by the mobile device; the method further comprising:
  determining, at the processor, an elapsed time between the receipt of the request and the time of the last successful data service access;
  when the elapsed time is greater than a threshold, blocking service to the mobile device and returning the message denying access to the data service.

15. The non-transitory computer-readable medium of claim 14, the method further comprising:
  blocking service to the mobile device by sending a message to a profile server via the network interface, for deactivating an account associated with the mobile device at the profile server.

16. The non-transitory computer-readable medium of claim 13, wherein the notification comprises a message indicating a replenishment time period.

17. The non-transitory computer-readable medium of claim 16, the method further comprising:
  receiving, at the processor via the network interface, a replenishment request from the mobile device;
  determining, at the processor, whether the replenishment request was received within the time period; and
  when the replenishment request was received within the time period, applying a replenishment amount and an additional replenishment amount to the account balance.

18. The non-transitory computer-readable medium of claim 17, the method further comprising:
  responsive to applying the replenishment amount, resetting the count of failed session requests.

* * * * *